(12) United States Patent
Evangelista et al.

(10) Patent No.: US 10,821,546 B2
(45) Date of Patent: Nov. 3, 2020

(54) METHOD OF FORMING A WELD NOTCH IN A SHEET METAL PIECE

(71) Applicant: Shiloh Industries, Inc., Valley City, OH (US)

(72) Inventors: James J. Evangelista, Northville, MI (US); Michael Telenko, Canton, MI (US); Jason E. Harfoot, Walled Lake, MI (US); Jack A. Atkinson, Brunswick, OH (US); James W. Walther, Litchfield, OH (US); Anthony M. Parente, Valley City, OH (US)

(73) Assignee: SHILOH INDUSTRIES, INC., Valley City, OH (US)

( * ) Notice: Subject to any disclaimer, the term of this patent is extended or adjusted under 35 U.S.C. 154(b) by 304 days.

(21) Appl. No.: 15/912,751

(22) Filed: Mar. 6, 2018

(65) Prior Publication Data
US 2018/0193949 A1    Jul. 12, 2018

Related U.S. Application Data

(63) Continuation of application No. 14/094,299, filed on Dec. 2, 2013, now abandoned.

(Continued)

(51) Int. Cl.
*B23K 26/0622* (2014.01)
*B23K 26/364* (2014.01)
(Continued)

(52) U.S. Cl.
CPC ........ *B23K 26/0622* (2015.10); *B23K 26/364* (2015.10); *B23K 26/38* (2013.01);
(Continued)

(58) Field of Classification Search
CPC ............ B23K 2101/18; B23K 2101/34; B23K 2103/04; B23K 2103/50; B23K 26/0622;
(Continued)

(56) References Cited

U.S. PATENT DOCUMENTS

| 2,177,868 A | 10/1939 | Chapman |
| 3,464,802 A | 9/1969 | Meyer |

(Continued)

FOREIGN PATENT DOCUMENTS

| CN | 1633333 A | 6/2005 |
| CN | 101128278 A | 2/2008 |

(Continued)

OTHER PUBLICATIONS

Korean Office Action for Application No. 10-2018-7008813 dated Dec. 19, 2018.

(Continued)

*Primary Examiner* — Ibrahime A Abraham
*Assistant Examiner* — Frederick F Calvetti
(74) *Attorney, Agent, or Firm* — Reising Ethington, P.C.

(57) ABSTRACT

Sheet metal pieces intended to be welded can be made with weld notches located along one or more edges. A weld notch is characterized by the absence of certain material constituents so that they do not unacceptably contaminate nearby welds. The weld notch can be created by first forming an ablation trench along the sheet metal piece, then separating the sheet metal piece along the formed ablation trench into two separate pieces, at least one of which includes a newly formed and weldable edge.

13 Claims, 6 Drawing Sheets

Related U.S. Application Data

(60) Provisional application No. 61/731,497, filed on Nov. 30, 2012, provisional application No. 61/784,184, filed on Mar. 14, 2013.

(51) Int. Cl.
  *B23K 26/40* (2014.01)
  *B23K 26/38* (2014.01)
  B23K 101/18 (2006.01)
  B23K 101/34 (2006.01)
  B23K 103/04 (2006.01)
  B23K 103/00 (2006.01)

(52) U.S. Cl.
  CPC .......... *B23K 26/40* (2013.01); *B23K 2101/18* (2018.08); *B23K 2101/34* (2018.08); *B23K 2103/04* (2018.08); *B23K 2103/50* (2018.08)

(58) Field of Classification Search
  CPC ...... B23K 26/364; B23K 26/38; B23K 26/40; B23K 2201/18; B23K 2201/34; B23K 2203/04; B23K 2203/50; B23K 26/0604; B23K 26/0608; B23K 26/0613; B23K 26/24; B23K 26/26
  USPC ....... 228/165, 166, 168, 169, 170, 172, 174; 219/121.69
  See application file for complete search history.

(56) References Cited

U.S. PATENT DOCUMENTS

| | | | |
|---|---|---|---|
| 3,733,681 A | 5/1973 | Schlein | |
| 4,037,073 A | 7/1977 | Becker | |
| 4,073,427 A | 2/1978 | Keifert et al. | |
| 4,401,727 A | 8/1983 | Berke et al. | |
| 4,459,062 A | 7/1984 | Siebert | |
| 4,474,861 A | 10/1984 | Ecer | |
| 4,642,446 A | 2/1987 | Pennington | |
| 4,688,691 A | 8/1987 | Christian | |
| 4,725,507 A | 2/1988 | Lescaut | |
| 4,758,703 A | 7/1988 | Dreyer | |
| 4,818,629 A | 4/1989 | Jenstrom et al. | |
| 4,970,600 A * | 11/1990 | Garnier | B23K 26/0853 219/121.68 |
| 5,268,556 A | 12/1993 | Coyle, Jr. | |
| 5,305,946 A | 4/1994 | Heilmann | |
| 5,952,109 A | 9/1999 | Nagami et al. | |
| 6,042,659 A | 3/2000 | Brown | |
| 6,296,170 B1 | 10/2001 | Hardwick | |
| 6,296,805 B1 | 10/2001 | Laurent et al. | |
| 6,313,434 B1 * | 11/2001 | Patterson | B23K 26/02 219/121.69 |
| 6,407,363 B2 * | 6/2002 | Dunsky | B23K 26/02 219/121.71 |
| 6,564,604 B2 | 5/2003 | Kefferstein et al. | |
| 6,572,984 B2 | 6/2003 | Brink | |
| 6,621,040 B1 | 9/2003 | Perry | |
| 6,674,472 B1 | 1/2004 | Tsutsui | |
| 6,770,544 B2 * | 8/2004 | Sawada | B23K 26/0853 438/462 |
| 6,800,150 B2 | 10/2004 | Totino et al. | |
| 7,020,023 B2 | 3/2006 | Kuramori | |
| 7,446,022 B2 * | 11/2008 | Yoshikawa | B23K 26/40 438/463 |
| 7,531,283 B2 | 5/2009 | Darcy, III et al. | |
| 7,748,598 B2 * | 7/2010 | Want | B01J 3/04 228/164 |
| 7,971,303 B2 | 7/2011 | Prasad et al. | |
| 8,319,148 B2 | 11/2012 | Nowak | |
| 8,614,008 B2 | 12/2013 | Canourgues | |
| 8,642,134 B2 | 2/2014 | Nagai | |
| 9,289,855 B2 * | 3/2016 | Evangelista | C22C 21/02 |
| 2001/0016268 A1 | 8/2001 | Maki | |
| 2001/0042393 A1 | 11/2001 | Kefferstein | |
| 2001/0054638 A1 | 12/2001 | Hardwick | |
| 2002/0148880 A1 | 10/2002 | Brink | |
| 2003/0006221 A1 * | 1/2003 | Hong | B23K 26/0604 219/121.72 |
| 2003/0201037 A1 * | 10/2003 | Totino | B23K 1/008 148/528 |
| 2004/0074882 A1 | 4/2004 | Speranza | |
| 2004/0247932 A1 | 12/2004 | Kagohara | |
| 2005/0136184 A1 | 6/2005 | Voges | |
| 2005/0211687 A1 | 9/2005 | Sonoda et al. | |
| 2006/0148211 A1 * | 7/2006 | Iwasaki | H01L 21/67092 438/462 |
| 2006/0243708 A1 * | 11/2006 | Ikenoue | B23K 26/032 219/121.62 |
| 2007/0034614 A1 | 2/2007 | McClain | |
| 2007/0045250 A1 | 3/2007 | Moor | |
| 2008/0011720 A1 | 1/2008 | Briand | |
| 2008/0145688 A1 * | 6/2008 | Miller | B23K 31/02 428/594 |
| 2008/0092312 A1 | 9/2008 | Prasad et al. | |
| 2008/0257871 A1 | 10/2008 | Leiser | |
| 2008/0268279 A1 * | 10/2008 | Want | B01J 3/04 428/615 |
| 2009/0220815 A1 * | 9/2009 | Canourgues | C23C 28/021 428/583 |
| 2009/0253809 A1 | 10/2009 | Gomurashvili et al. | |
| 2010/0044353 A1 * | 2/2010 | Olsen | B23K 26/0604 219/121.67 |
| 2010/0139691 A1 | 6/2010 | Silberberg et al. | |
| 2010/0139864 A1 | 6/2010 | Silberberg et al. | |
| 2011/0226746 A1 | 9/2011 | Briand | |
| 2011/0287607 A1 * | 11/2011 | Osako | B23K 26/0608 438/462 |
| 2012/0074106 A1 * | 3/2012 | Canourgues | C22C 38/32 219/121.64 |
| 2012/0145686 A1 * | 6/2012 | Alpay | B23K 26/0734 219/121.67 |
| 2012/0205355 A1 | 8/2012 | Münzer | |
| 2013/0236239 A1 | 9/2013 | Brandt | |
| 2013/0316185 A1 * | 11/2013 | Evangelista | B23K 26/40 428/601 |
| 2014/0003860 A1 * | 1/2014 | Evangelista | B23K 9/235 403/270 |
| 2014/0057128 A1 | 2/2014 | Canourgues | |
| 2014/0270922 A1 * | 9/2014 | Evangelista | B23K 26/361 403/270 |
| 2017/0232560 A1 * | 8/2017 | Canourgues | C23C 28/021 403/272 |
| 2019/0271341 A1 * | 9/2019 | Canourgues | C22C 38/02 |
| 2019/0271342 A1 * | 9/2019 | Canourgues | C21D 6/002 |

FOREIGN PATENT DOCUMENTS

| | | |
|---|---|---|
| CN | 101204866 A | 6/2008 |
| CN | 101426612 | 5/2009 |
| CN | 101628355 | 1/2010 |
| CN | 101663717 | 3/2010 |
| DE | 2122926 A1 | 11/1972 |
| DE | 102010019258 | 11/2011 |
| EP | 0971044 | 1/2000 |
| EP | 1143029 | 10/2001 |
| EP | 1878531 | 1/2008 |
| FR | 2827874 | 1/2003 |
| JP | 58-218389 A | 12/1983 |
| JP | 60-257984 A | 12/1985 |
| JP | S61159292 A | 7/1986 |
| JP | S62263882 A | 11/1987 |
| JP | H03258484 A | 11/1991 |
| JP | H04237570 A | 8/1992 |
| JP | H06198471 A | 7/1994 |
| JP | H0741841 A | 2/1995 |
| JP | 07096380 | 4/1995 |
| JP | H07293749 A | 11/1995 |
| JP | 08-187588 A | 7/1996 |
| JP | H09501105 A | 2/1997 |
| JP | 9314337 A | 12/1997 |

(56) References Cited

FOREIGN PATENT DOCUMENTS

| | | | |
|---|---|---|---|
| JP | H10168545 A | | 6/1998 |
| JP | H10176287 A | | 6/1998 |
| JP | 10277763 | * | 10/1998 |
| JP | 10-296490 A | | 11/1998 |
| JP | H11239872 A | | 9/1999 |
| JP | 2000281373 | * | 10/2000 |
| JP | 2001252781 A | | 9/2001 |
| JP | 2001300753 | * | 10/2001 |
| JP | 2002256407 A | | 9/2002 |
| JP | 2003183802 A | | 7/2003 |
| JP | 2003-334674 A | | 11/2003 |
| JP | 2004223543 A | | 8/2004 |
| JP | 2004344919 A | | 12/2004 |
| JP | 4200872 | | 5/2005 |
| JP | 2007049164 A | | 2/2007 |
| JP | 2007154257 A | | 6/2007 |
| JP | 2007237216 A | | 9/2007 |
| JP | 2009534529 A | | 9/2009 |
| JP | 2009226475 A | | 10/2009 |
| JP | 2010052161 A | | 3/2010 |
| JP | 2011041982 A | | 3/2011 |
| KR | 10198980056004 A | | 9/1998 |
| KR | 2004-0058615 A | | 7/2004 |
| KR | 20050103379 A | | 10/2005 |
| KR | 1020090005004 A | | 1/2009 |
| KR | 20100120584 A | | 11/2010 |
| WO | WO2009092760 A1 | | 7/2009 |
| WO | WO2011020490 A1 | | 2/2011 |

OTHER PUBLICATIONS

Translation of Korean Office Action for Application No. 10-2018-7008813 dated Dec. 19, 2018.

Japanese Office Action for Application No. 2017-151567 dated Jan. 29, 2019.

Translation of Japanese Office Action for Application No. 2017-151567 dated Jan. 29, 2019.

Office Action issued by the Japanese Patent Office for application No. 2017-11665.

Translation of Office Action issued by the Japanese Patent Office for application No. 2017-11665.

Tilmann Schmidt-Sandte, Laserstrahlbasierte Entgratverfahren fur Feinwerktechnische Anwendungen, 2003, Fig 3.8 p. 27 and point 2 p. 32.

Reinhold Braun, Nd:YAG Laser Butt Welding of AA6013 Using Silicon and Magnesium Containing Filler Powders, A 426, Materials Science and Engineering, Jun. 25, 2006.

Vierstraete; Ehling; Pic; Yin, Laser Ablation for Hardening Laser Welded Steel Blanks, Industrial Laser Solutions, Mar. 2010, pp. 6-11.

* cited by examiner

METHOD OF FORMING A WELD NOTCH IN A SHEET METAL PIECE

REFERENCE TO RELATED APPLICATIONS

This application claims the benefit of U.S. Provisional Ser. Nos. 61/731,497 filed on Nov. 30, 2012 and 61/784,184 filed on Mar. 14, 2013, and U.S. Non-Provisional Ser. No. 14/094,299 filed on Dec. 2, 2013, the entire contents of which are incorporated herein by reference.

TECHNICAL FIELD

The present disclosure generally relates to sheet metal pieces and, more particularly, to sheet metal pieces that are coated with one or more thin material layers and are used in welding processes.

BACKGROUND

In an effort to improve resistance to corrosion, scaling and/or other processes, sheet metal made of high-strength or hardenable steel alloys are now being made with one or more thin coating material layers, such as aluminum- and zinc-based layers. Although these coating material layers can impart desirable qualities to the sheet metal, their presence can contaminate welds, thereby reducing weld strength, integrity, etc. This is particularly true if the coated sheet metal piece is being butt welded or lap welded to another sheet metal piece.

SUMMARY

In accordance with one embodiment, there is provided a method of forming a weld notch in a sheet metal piece that comprises the steps of: (a) providing a sheet metal piece having a plurality of material layers, wherein the plurality of material layers includes a base material layer, a coating material layer, and an intermediate material layer being located between the base material layer and the coating material layer and including an intermetallic compound having at least one constituent from each of the base material layer and the coating material layer; (b) forming an ablation trench along the sheet metal piece by removing at least a portion of the coating material layer and a portion of the intermediate material layer along an ablation path so that the ablation trench is spaced away from an edge of the sheet metal piece and a portion of the base material layer is exposed at the ablation trench; and (c) cutting the sheet metal piece along the ablation trench at a trim line to form the weld notch, wherein the trim line is located at the portion of the base material layer that is exposed and at the trim line, material from both the coating material layer and the intermediate material layer is completely removed but a substantial portion of the base material layer remains.

In accordance with another embodiment, there is provided a method of forming a weld notch in a sheet metal piece that comprises the steps of: (a) providing a sheet metal piece having a plurality of material layers, wherein the plurality of material layers includes a base material layer, a coating material layer, and an intermediate material layer being located between the base material layer and the coating material layer and including an intermetallic compound having at least one constituent from each of the base material layer and the coating material layer; (b) forming an ablation trench along the sheet metal piece by removing at least a portion of both the coating material layer and the intermediate material layer along an ablation path with a laser, wherein the ablation trench is defined in part by surfaces that oppose each other across the width of the ablation trench and a third surface extending between the opposing surfaces, the third surface is formed so that the ablation trench has a non-uniform depth across its corresponding width (W'); and (c) removing a portion of the sheet metal piece that includes one of the opposing surfaces formed in step (b) to form the weld notch, wherein the weld notch is partly defined by the other of the opposing surfaces.

In accordance with another embodiment, there is provided a method of forming a weld notch in a steel sheet metal piece that comprises the steps of: (a) providing a steel sheet metal piece having opposite first and second sides and a sheared edge extending therebetween, wherein material from a coating material layer along the first side extends at least partially along the sheared edge toward the second side in a shearing direction, wherein the coating material layer has a different composition than the steel sheet metal piece; (b) removing some of the coating material layer from the steel sheet metal piece along a pre-determined trim line location; and (c) separating the steel sheet metal piece into first and second pieces along the trim line location, wherein the first piece includes a newly formed weldable edge having a portion of steel exposed on the first side of the steel sheet metal piece, and wherein the second piece includes the sheared edge.

DRAWINGS

Preferred exemplary embodiments will hereinafter be described in conjunction with the appended drawings, wherein like designations denote like elements, and wherein:

FIGS. 1A-C are cross-sectional views of a conventional weld joint joining sheet metal pieces that did not have weld notches formed therein before welding;

DETAILED DESCRIPTION

The sheet metal pieces disclosed herein can be made with weld notches located along one or more edges, where the weld notches are characterized by the absence of certain material constituents so that they do not unacceptably contaminate nearby welds. For instance, a sheet metal piece can be produced so that material from one or more coating material layers is reduced or removed at a weld notch located along the sheet metal edge. This, in turn, can prevent contamination by the coating material layers of a nearby weld joint formed along the sheet metal edge and thereby preserve the strength and/or durability of the weld joint in subsequent processes or during its service life. A trench ablation process can be used to form high quality weld notches in a manner that is relatively insensitive to sheet metal edge conditions.

Figure 1A:
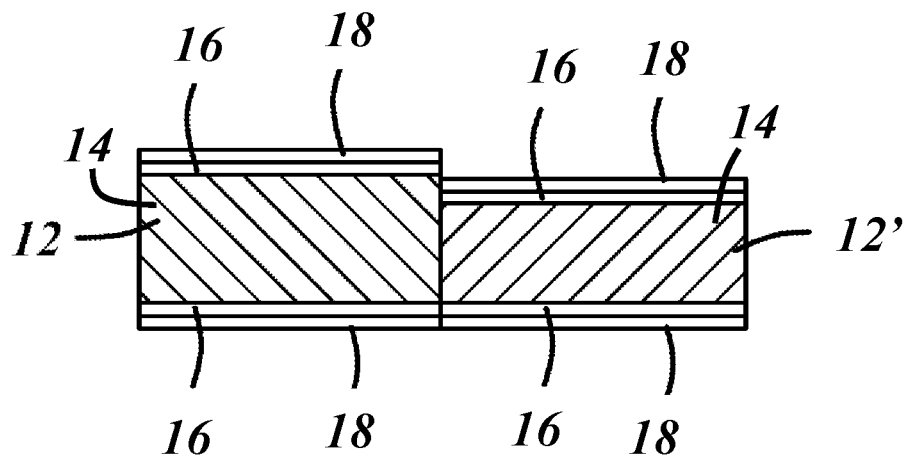
Figure 1B:
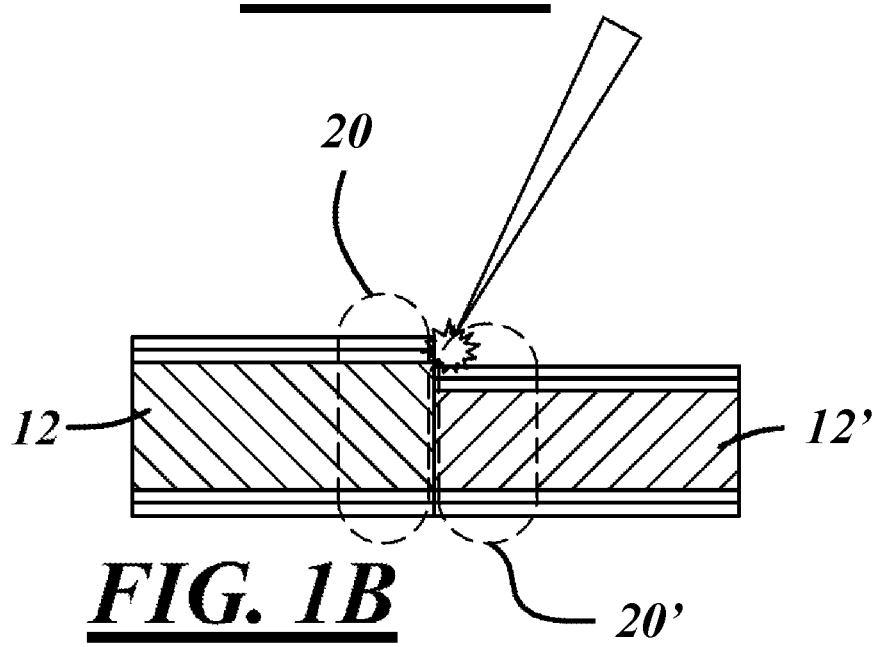
Figure 1C:
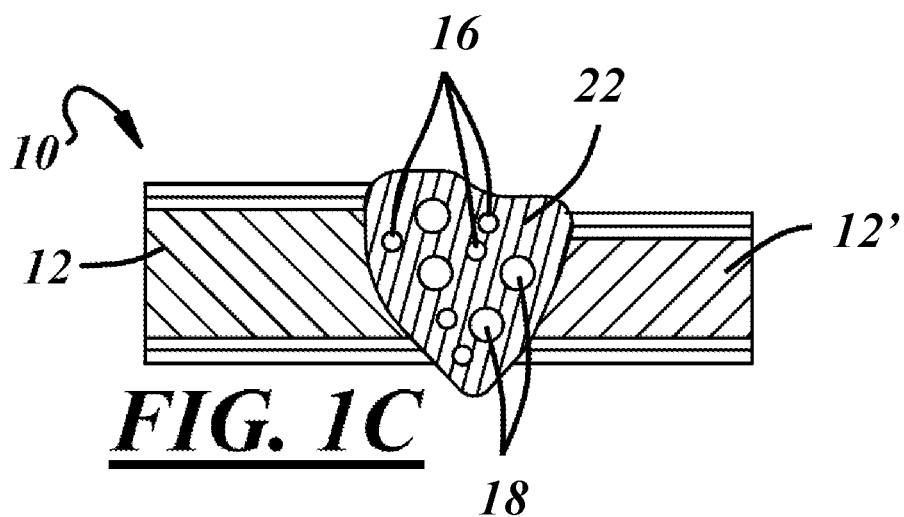

Turning first to FIGS. 1A-C, there are shown some of the steps involved with manufacturing a conventional tailor-welded blank 10 that includes thick and thin sheet metal pieces 12, 12' laser welded together in an edge-to-edge fashion. According to this example, each of the sheet metal pieces 12, 12' has a base material layer 14 and multiple thin material layers 16, 18 covering opposite surfaces of the base material layer. As is appreciated by those skilled in the art, there are numerous material layers that could be found on sheet metal stock, including various types of surface treatments, coating material layers such as aluminum- and zinc-based material layers (e.g., aluminum compounds), oils and other oxidation preventing substances, contaminants from the manufacturing or material handling processes, and oxidation layers, to name but a few. Once the two sheet metal pieces are brought together in abutment, a laser beam or other welding tool is used to melt some of the sheet metal located in edge regions 20, 20' so that a certain amount of the thin material layers 16, 18 becomes embedded within the resulting weld joint 22. Unless first removed, these unwanted constituents could have a negative impact on the overall strength and quality of the weld joint.

Figure 2:
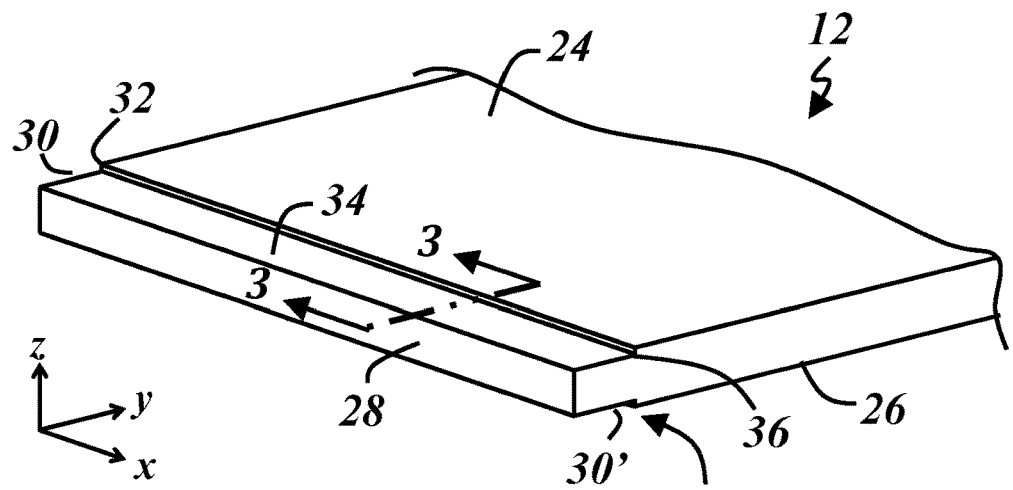
FIG. 2 is a perspective view of an edge region of an exemplary sheet metal piece, including weld notches on opposite sides of the sheet metal piece.

Referring to FIG. 2, there is shown an exemplary sheet metal piece 12 that may be formed by the present method and subsequently welded to an adjacent piece along an edge region 20. The sheet metal piece 12 includes opposite first and second sides 24, 26, and the edge region 20 is located along an edge 28 that is to be welded. The particular edge region 20 shown in FIG. 2 includes two weld notches 30, 30', where the two weld notches extend along the edge region on opposite sides 24, 26 of the sheet metal piece 12. Each weld notch 30, 30' is defined by a first notch surface 32 and a second notch surface 34 that intersect or join each other. Though shown with generally perpendicular first and second notch surfaces 32, 34 along a single, straight edge region 20, the weld notches may be configured in numerous ways. For example, a weld notch can: include one or more off-axis or offset notch surfaces, have a uniform or non-uniform depth and/or width, differ from other weld notches located on the same sheet metal piece in terms of size, shape, configuration, etc., or be part of an edge region located along a straight edge, a curved edge, multiple straight or curved edges, or some other part of the sheet metal piece, to cite several possibilities. Some of these different embodiments are illustrated in the drawings.

Figure 3:
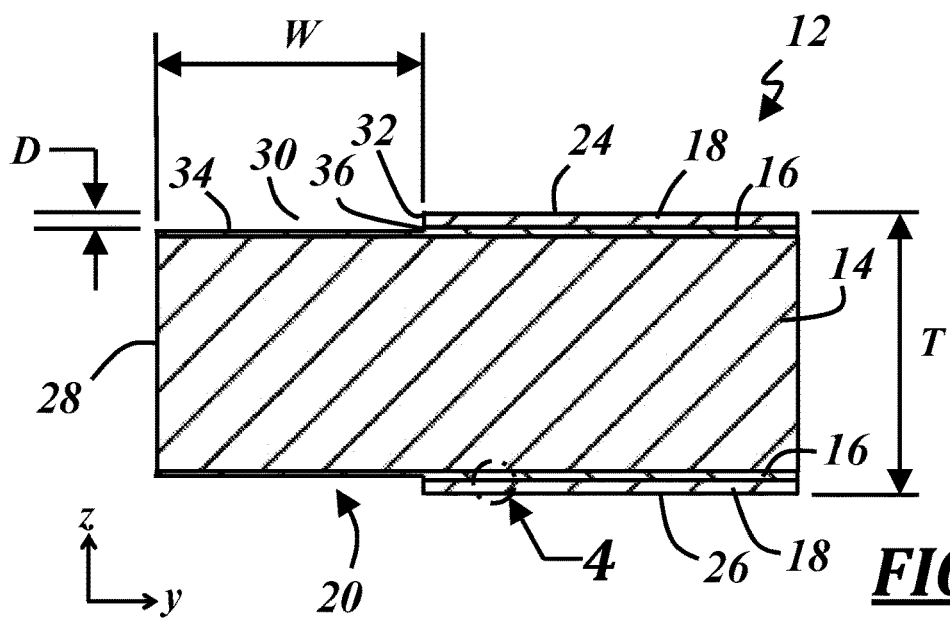
FIG. 3 is a cross-sectional view of a portion of the sheet metal piece of FIG. 2.

FIG. 3 is a cross-section of the edge region 20 of the sheet metal piece 12 that is shown in FIG. 2. The illustrated sheet metal piece 12 includes multiple material layers, including the base material layer 14, intermediate material layers 16, and coating material layers 18. In this embodiment, the base material layer 14 is the central or core material layer (e.g., a steel core) and is sandwiched between the intermediate material layers 16 and the coating material layers 18. The base material layer 14 makes up the majority of the thickness T of the sheet metal piece 12 and thus may contribute significantly to the mechanical properties of the sheet metal piece. The coating material layers 18 are located over opposite surfaces of the base material layer 14 and are the outermost layers of the sheet metal piece 12. Each coating material layer 18 is relatively thin with respect to the base material layer 14 and may be selected to enhance one or more characteristics of the sheet metal piece (e.g., corrosion resistance, hardness, weight, formability, appearance, etc.). The coating material layer 18 may also be selected for use or compatibility with subsequent processes, such as heat treatment or inter-diffusion processes, for example.

Figure 4:
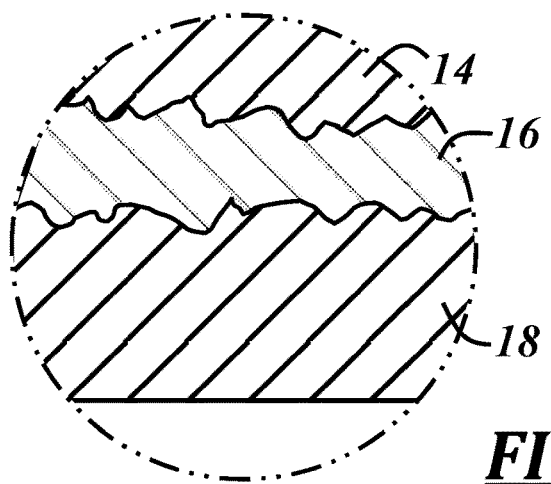
FIG. 4 is an enlarged portion of the cross-sectional view of the sheet metal piece of FIG. 3 showing some of the thin material layers.

Each intermediate material layer 16 is located between the base layer 14 and one of the coating layers 18, and is in contact with each in this embodiment. The intermediate material layer 16 includes at least one constituent in common from each of the immediately adjacent layers 14, 18, such as an atomic element or chemical compound. The intermediate material layer 16 may be a reaction product of the base and coating material layers 14, 18. For example, a dip coating process, in which the base material layer is immersed or passed through a molten bath of the coating material, can result in a chemical reaction at the interface of the base material layer and the molten bath, and the reaction product is the intermediate material layer 16. In one specific example of such a dip coating process, the base material layer 14 is steel and the coating material layer 18 is an aluminum alloy. The molten bath of aluminum alloy reacts with the base material layer at its surface to form the intermediate material layer 16, which includes iron-aluminum ($Fe_xAl_y$) intermetallic compounds such as $Fe_2Al_5$. The intermediate material layer 16 can have a higher content of the base material layer constituent (e.g., iron) in areas closer to the base material layer 14, and a higher content of the coating material layer constituent (e.g., aluminum) in areas closer to the coating material layer 18. Though shown in FIG. 3 as a perfectly planar layer with a constant thickness, the intermediate material layer 16 may be irregular along its opposite surfaces as depicted in the enlarged view of FIG. 4. The sheet metal piece 12 may include other, additional material layers as well, and is not limited to the particular arrangement described here.

One specific example of a multi-layered sheet metal piece that is useful for forming parts in the automotive and other industries is a coated steel product, such as that shown in FIG. 3. In one particular embodiment, the base material layer 14 is a high-strength or hardenable steel alloy such as a boron steel alloy or a high-strength low-alloy (HSLA) steel. Some materials, while strong for their weight, often require heat treating processes to attain the high-strength properties and/or can only be formed at high temperatures. The coating material layer 18 may be selected to help prevent oxidation during heat treatment, to be lighter in weight than the base material layer 14, and/or to interdiffuse with the other layers of the sheet metal piece 12 during subsequent heat treatment. In one embodiment, the coating material layer 18 is pure aluminum (Al) or an aluminum alloy, such as an Al-silicone (Al—Si) alloy. Other possible compositions for coating material layer 18 include pure zinc and zinc alloys or compounds (e.g., where the underlying material is galvanized). Where the base material layer 14 is steel and the coating material layer 18 comprises aluminum, the intermediate material layer 16 may include iron and aluminum in the form of inter-metallic compounds such as $FeAl$, $FeAl_2$, $Fe_3Al$ or $Fe_2Al_5$. The intermediate material layer 16 may also include an alloy of constituents from adjacent layers.

Some exemplary material layer thicknesses range from about 0.5 mm to about 2.0 mm for the base material layer 14, from about 1 µm to about 15 µm for the intermediate layer 16, and from about 5 µm to about 100 µm for the coating material layer 18. Of course, these ranges are non-limiting, as individual layer thicknesses depend on several factors specific to the application and/or the types of materials employed. For example, the base material layer 14 can be a material other than steel, such as an aluminum alloy or some other suitable material, in which case the thickness may be outside of the exemplary range above. The method described herein may be used with sheet metal pieces having more or less material layers than shown in the figures. Skilled artisans will also appreciate that the figures are not necessarily to scale and that the relative thicknesses of layers 14-18 may differ from those illustrated in the drawings.

Referring again to FIG. 3, the weld notch 30 on the first side 24 of the sheet metal piece will be described. This description applies to the weld notch 30' on the opposite second side 26 as well. The weld notch 30 is a portion of the edge region 20 of the sheet metal piece 12 where some material has been removed or omitted from the otherwise uniform layered structure. The weld notch 30 promotes a high quality weld joint along edge 28 when the sheet metal piece is welded to another piece, and may do so via a configuration that reduces or eliminates the coating material layer 18 and/or the intermediate material layer 16 in the edge region 20 so that it does not become a part of a subsequent weld joint. This is particularly useful where the coating material layer 18 includes one or more constituents that form discontinuities in or would otherwise weaken the resulting weld joint if included therein. The weld notch 30 has a notch width W and notch depth D, each being relatively constant along the length of edge 28 in this particular embodiment. The notch width W is the distance from edge 28 to the first notch surface 32, and the notch depth D is the distance from the first side 24 (i.e., the outer surface of the coating material layer 18) to the second notch surface 34. Where the weld notch 30 is square with the sheet metal piece, as shown in this particular example, the notch width W is equal to the width of the second notch surface 34, and the notch depth D is equal to the width of the first notch surface 32.

The dimensions of the weld notch 30 may be related to the thickness T of the sheet metal piece, to the intended size of the weld joint to be formed at edge 28, and/or to one or more material layer thicknesses. In one embodiment, notch width W is in a range from about 0.5 to about 1.5 times the thickness T. In another embodiment, the notch width W is in a range from about 0.5 mm to about 4 mm. The notch width W may also be at least one half of the width of the intended weld joint. The notch depth D for the example shown in FIG. 3 is greater than the thickness of the coating material layer 18 and less than the combined thickness of the intermediate and coating material layers 16, 18, but this is not necessary and may differ in some of the other exemplary embodiments.

The weld notch 30 can also be described with relation to certain characteristics of the notch surfaces 32, 34. For example, in the embodiment of FIG. 3, the first notch surface 32 includes material from both the intermediate material layer 16 and the coating material layer 18. The second notch surface 34 includes material from the intermediate material layer 16 only, and the first and second notch surfaces intersect along a junction or corner 36 that is positioned or located in the intermediate material layer. Thus, in this particular example, the weld notch 30 is formed in the sheet metal piece 12 by removing the entire coating material layer 18 and a portion of the intermediate material layer 16 along edge region 20. In other examples, the weld notch may be formed by removing only a portion of the coating material layer 18, or by removing the entire coating and intermediate material layers 18, 16 and a portion of the base material layer 14. Each of the notch surfaces 32, 34 may also include striations, witness lines, or other indicators of the type of process used to remove material at the weld notch location.

Figure 5:
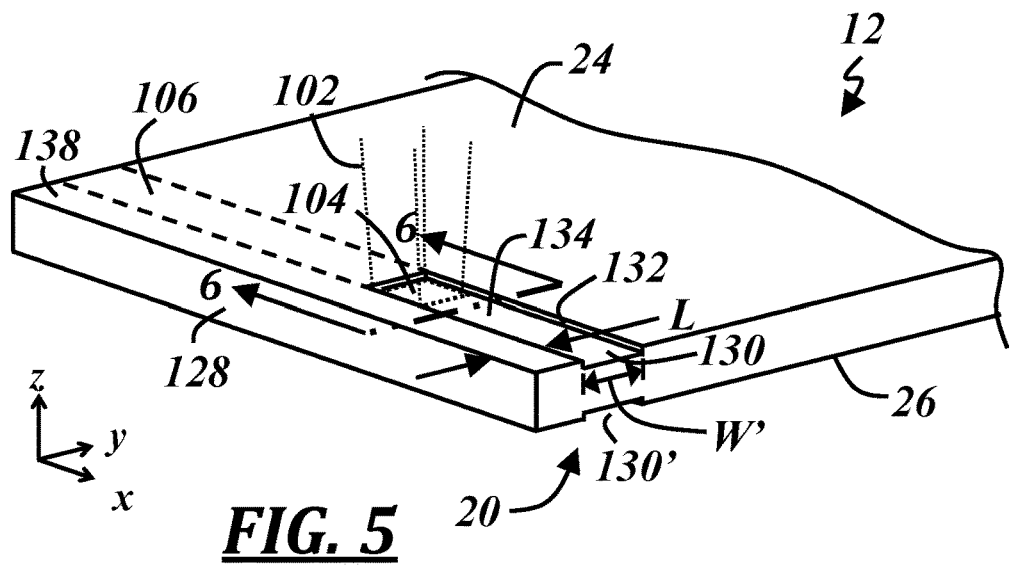
FIG. 5 is a perspective view of an exemplary ablation process forming an ablation trench in a sheet metal piece.
Figure 6:
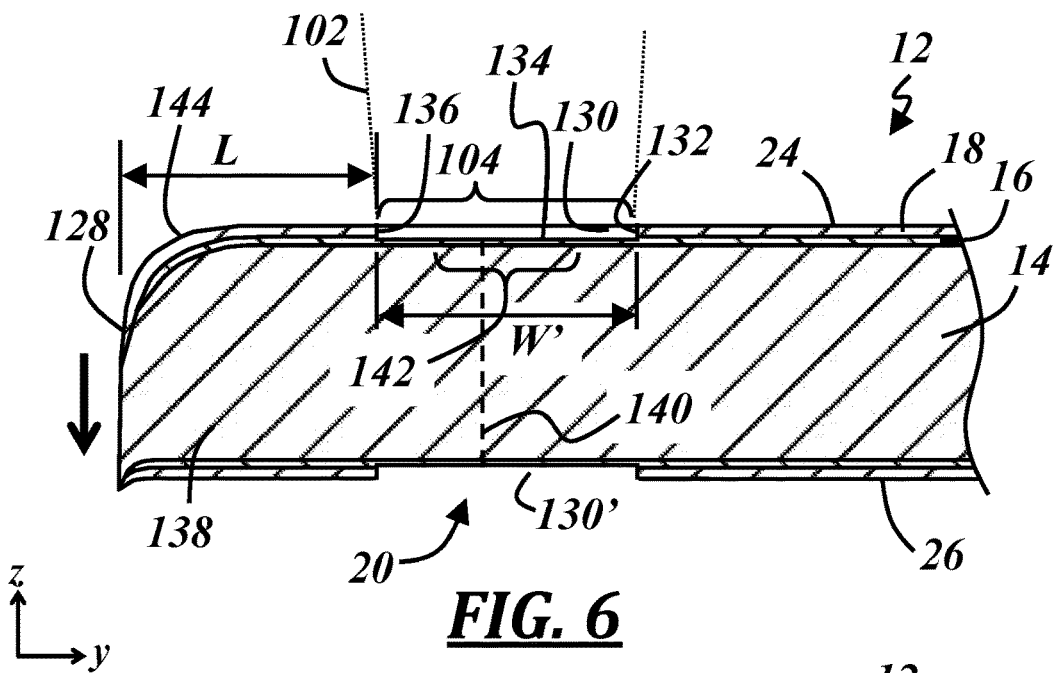
FIG. 6 is a cross-sectional view of the sheet metal piece of FIG. 5.
Figure 7:
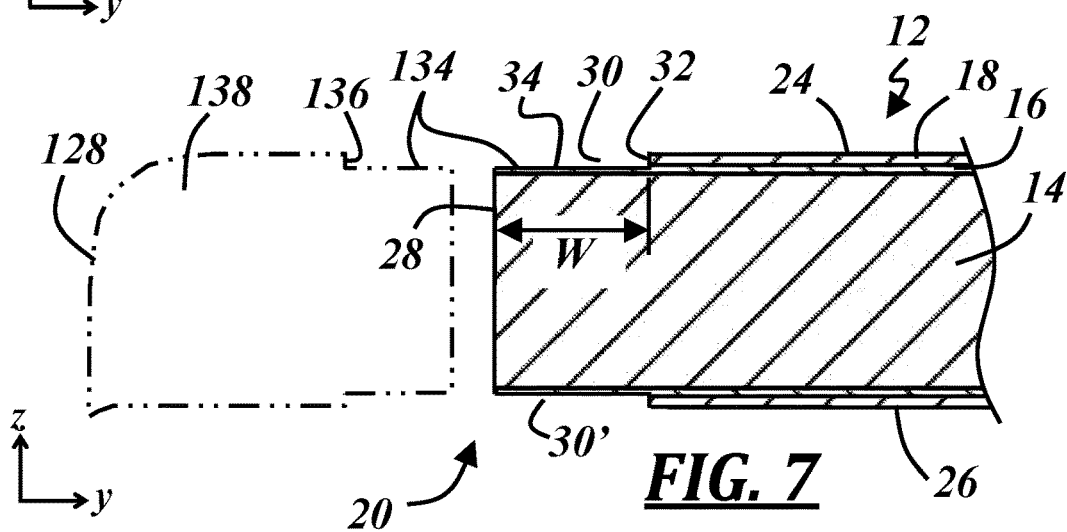
FIG. 7 is a cross-sectional view of the sheet metal piece of FIG. 6, where a portion of the edge region has been removed to form a weld notch.

Referring now to FIGS. 5-7, there is shown an exemplary method for forming the weld notch 30 in the sheet metal piece 12. The method includes using a laser ablation process to form an ablation trench 130 along the edge region 20 and subsequently removing a portion 138 of the edge region to form the weld notch 30. As shown in FIG. 5, a laser beam 102 is directed at the edge region 20 from a laser source (not shown) to form the ablation trench 130 along the edge region. Energy provided by the laser beam 102 is transferred to the sheet metal piece 12 in the form of thermal energy at an ablation site or laser spot 104, melting and/or vaporizing material at the ablation site in order to remove material from one or more layers of the sheet metal piece. The laser beam 102 follows a path 106 along the edge region 20 to form the trench 130 in the desired configuration and location. For sheet metal pieces that include base, intermediate, and coating material layers 14, 16, 18, such as that shown in FIG. 3, the ablation trench 130 may be formed by removing all or some of the coating material layer 18, all or some of the intermediate material layer 16, and/or some of the base material layer 14 along the ablation path 106. In certain applications where it is important that there be very little, if any, material layer contaminants in a resulting weld, it can be useful to completely remove both of the material layers 16 and 18 in the area of the ablation trench 130 so that the base material layer 14 is exposed. In the illustrated example, the sheet metal piece 12 is shown with an ablation trench 130' already formed along the edge region on the opposite side 26 of the sheet metal piece. It should be appreciated that non-laser methods may be used to form the ablation trench, such as scraping, grinding and/or other mechanical techniques for removing material.

During the present method, the sheet metal piece 12 may be held stationary while the laser beam 102 moves along the path 106. In a different embodiment, the sheet metal piece 12 is moved or indexed while the laser beam 102 remains stationary. Other techniques, such as moving both the laser source and the sheet metal piece, may be employed as well. Some portions of the path 106 can be straight or rectilinear, as shown in FIG. 5, while other portions can be contoured, curved or curvilinear; it is not necessary for the ablation trench 130 to follow a straight path 106, as paths having other configurations can be followed instead. Any suitable laser or other comparable light emitting device may be used to form ablation trenches, and may do so using a variety of operating or equipment parameters. In one example, the laser source is a Q-switched laser, but other continuous wave and pulsed laser types may be used instead such as various nanosecond, femtosecond and picosecond pulsed lasers. The laser spot or footprint 104 can be round, square, rectangular, elliptical, or any other suitable shape, as will be subsequently explained. Non-limiting examples of selectable or adjustable operating parameters for the laser source may include: laser power, pulse frequency, pulse width, pulse energy, pulse power, duty cycle, spot area, the overlap between successive laser pulses, and the speed of the laser source relative to sheet metal piece 12, to cite a few possibilities. Any combination of these operating parameters may be selected and controlled by the present method based on the particular needs of the application.

The ablation trench 130 is formed so that it is spaced away from a starting edge 128 of the sheet metal piece 12. In other words, the laser beam 102 does not impinge the starting edge 128 of the sheet metal piece during the laser ablation process, according to this particular embodiment. The laser spot 104 is spaced from the starting edge 128 by a distance L as it moves along path 106. The trench 130 can be formed by a single pass of the laser beam 102 along the x-direction, where the laser spot 104 has the same width W' as the desired trench and removes the desired amount of material in one pass. In other examples, where the width of the laser spot 104 is less than the desired width W' of the trench 130, the trench is formed in multiple passes of the laser beam 102 along the x-direction at different distances from the starting edge 128. Or the trench 130 may be formed in a single pass of the laser beam along the x-direction with the laser beam moving back and forth in the y-direction during the single pass in the x-direction; this technique results in numerous short passes in the y-direction, where each pass is spaced from an adjacent pass by a small distance in the x-direction.

The resulting ablation trench 130 includes one or more surfaces that subsequently define the final weld notch 30 of FIG. 7. As is best shown in FIG. 6, the ablation trench 130 includes first, second, and third trench surfaces 132, 134, and 136, some of which subsequently define the final weld notch 30. In the illustrated example, the surfaces 132-136 are generally orthogonal with respect to each other and with respect to the sheet metal piece 12. The first and third surfaces 132, 136 oppose one another across the width of the trench 130 with the second trench surface 134 extending therebetween. Surfaces 132, 136 are generally parallel with one another and perpendicular to the plane of the sheet metal piece 12, while the second surface 134 is generally parallel with the plane of the sheet metal piece. The overall size, shape, orientation, etc. of the trench surfaces are largely driven by the attributes of the laser beam that is used to cut the trench. Other ablation trench profiles are certainly possible, as described below in additional examples.

As shown in FIG. 7, a portion 138 of the edge region 20 is removed from the sheet metal piece 12 after the ablation trench 130 is formed, resulting in weld notch 30. At least a portion of the second trench surface 134 remains with the sheet metal piece 12 to become the second notch surface 34 of the resulting weld notch 30. The first trench surface 132 becomes the first weld notch surface 32, while the third trench surface 136 is discarded with the removed portion 138. Though distinguished here as surfaces of different features —i.e., trench and notch surfaces —the first trench surface 132 becomes the first weld notch surface 32. Thus, it may be said that the first weld notch surface 32 is formed during the laser ablation process. Likewise, the second notch surface 34 is formed during the ablation process as part of the second trench surface 134. The weldable edge 28 of the sheet metal piece 12 is formed when portion 138 is removed.

The removed portion 138 includes the starting edge 128 of the sheet metal piece 12, as well as the third trench surface 136. The removed portion 138 may also include a portion of the second trench surface 134, as shown in FIG. 7. Any suitable technique may be used to remove portion 138 from the sheet metal piece 12 in order to form the weld notch 30 and adjacent edge 28, such as cutting, shearing, milling or trimming with a blade, laser, or other cutting tool. Edge 28 is formed at a pre-determined location or trim line 140, shown in FIG. 6, which lies between the first and third surfaces 132, 136 of the ablation trench 130. In one embodiment, the third trench surface 136 and the trim line 140 are generally co-located so that the entire trench surface 134 remains part of the resulting weld notch 30 —i.e, widths W and W' are the same. The trim line 140 may be located anywhere between the first and third surfaces 132, 136 and is spaced from the first trench surface 132 by the desired width W of the finished weld notch 30. The trim line 140 preferably lies within a central region 142 of the trench 130, the central region being equally spaced from the first and third surfaces 132, 136 and comprising 40-60% of the second surface 134.

Forming the weld notch 30 by first forming an ablation trench 130 in the sheet metal piece 12 and subsequently trimming or removing portion 138 results in a newly formed weldable edge 28 that is free from material from the coating material layer 18 and/or the intermediate material layer 16. Though not necessarily intentional, the starting edge 128 of the sheet metal piece 12 may include material from the coating material layer 18 and/or the intermediate material layer 16 that has been smeared, wiped and/or otherwise pulled along the edge during a previous trimming operation; this is best illustrated in FIG. 6. In other words, the coating material layer 18 and/or the intermediate material layer 16 may wrap around a corner 144 of the sheet metal piece so that it is present along at least a portion of the starting edge 128. In the illustrated example, the starting edge 128 was formed in a previous shearing operation in which a shearing blade cut the material in the direction indicated by the downward-pointing arrow. Such a shearing operation may be performed at a steel mill or a metal-coating facility where the base material layer 14 is first coated and then cut or slit to the desired width for shipment. Forming the weld notch 30 in a process that removes the starting edge 128 eliminates any unintended coating material at the finished edge 28 of the sheet metal piece that could otherwise contaminate the weld joint that is eventually formed at that edge.

Figure 8:
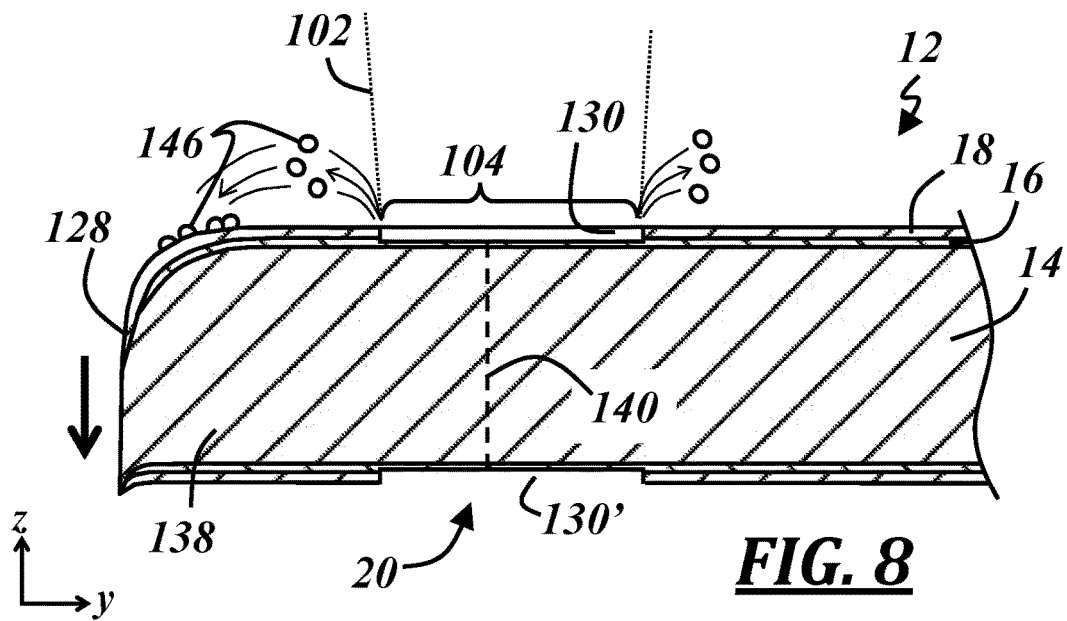
FIG. 8 is the cross-sectional view of FIG. 6, showing expulsed material being ejected from the ablation site.
Figure 9:
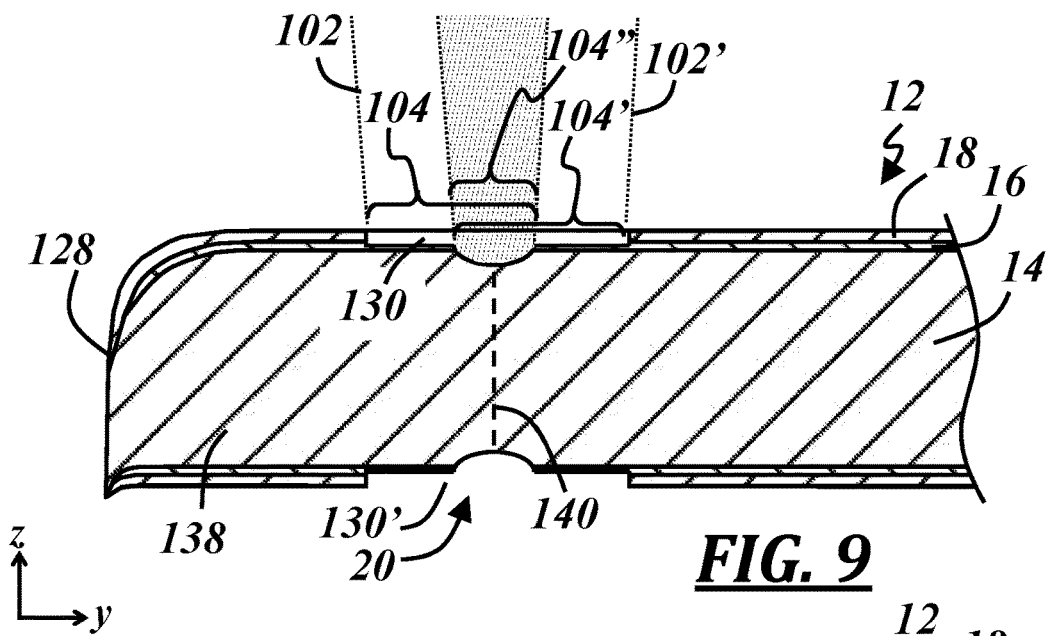
FIG. 9 is a cross-sectional view of a dual-beam ablation process forming an ablation trench with a non-uniform depth in a sheet metal piece.
Figure 10:
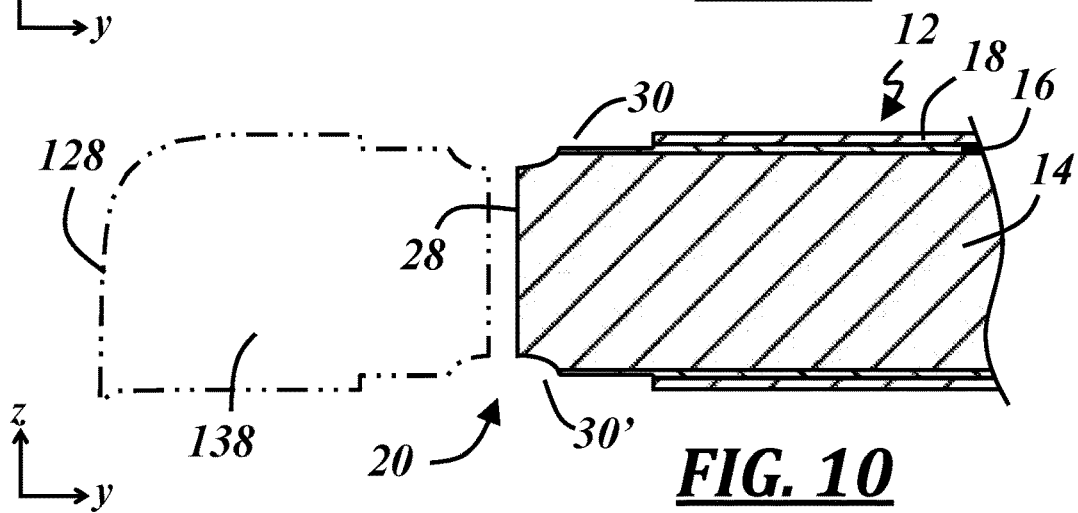
FIG. 10 is a cross-sectional view of the sheet metal piece of FIG. 9, where a portion of the edge region has been removed to form a weld notch with a non-uniform depth.

Another unintended source of coating material at the starting edge 128 is the laser ablation process itself. As shown in FIG. 8, material removed by the ablation process can sometimes be deposited along some other portion of the edge region 20, including at or near the starting edge 128. In the illustrated example, expulsed material 146 may be ejected by shockwaves or other rapid material expansion present at the area of the laser spot 104. Molten droplets of expulsed material 146 may be deposited on the sheet metal piece away from the formed trench 130, where they solidify. A similar phenomenon may exist even in ablation processes where the weld notch 30 is formed directly along the starting edge 128 (e.g., where L=0 in FIGS. 5-6) and expulsed material solidifies along the edge. Because the expulsed material 146 may include material from the coating material layer 18 and/or the intermediate material layer, it represents a potential weld joint contaminant. Removing portion 138 of the edge region 20 or otherwise trimming the sheet metal piece along the above-described ablation trench 130 can eliminate this potential contaminant. Skilled artisans will realize other advantages in forming the weld notch 30 as described herein.

Turning now to FIGS. 9-12, there is shown an example of a multi-laser or dual-beam ablation process where first and second laser beams 102, 102' overlap at a composite laser spot 104", at which the combined energy of the lasers is greatest. In the illustrated example, the composite or overlapping laser spot 104" is at approximately the center of the formed trench 130, and more material removal occurs at the composite spot than at locations where the two laser spots 104, 104' do not overlap; this is demonstrated by the shape of the ablation trench 130, which is deeper in the center of the trench. In the illustrated example, the location of the trim line 140 coincides with the location of the composite laser spot 104". Such a dual-beam process may be useful for forming a weld notch 30 having a non-constant or non-uniform depth D across its width W, such as the weld notch illustrated in FIG. 10. For instance, this process may remove material from the coating material layer 18, the intermediate material layer 16, and the base material layer 14 at the composite laser spot 104", while only removing material from the coating material layer 18 and/or the intermediate material layer 16 at the non-overlapping portions of the laser spots 104, 104'. The portion of the ablation trench 130 formed at the composite laser spot 104" may also be used as a visual indicator in the subsequent trimming operation of FIG. 10 where portion 138 is removed. For example, the different color and/or contour of the ablation trench 130 at the deeper center portion of the trench may be perceived by an operator in a manual trimming operation and/or by a vision system or the like in an automated trimming operation.

Figure 11:
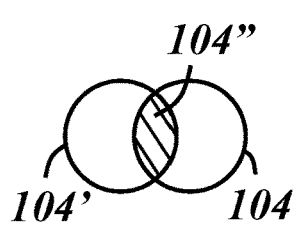
FIG. 11 illustrates an example of overlapping laser spots that may be used with the ablation process of FIG. 9, along with a corresponding energy distribution for the overlapping laser spots.
Figure 11:
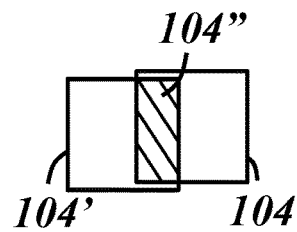
Figure 11:
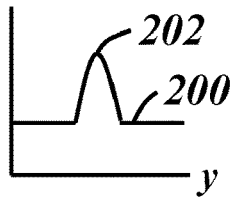
Figure 12:
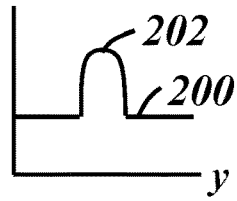
FIG. 12 illustrates another example of overlapping laser spots that may be used with the ablation process of FIG. 9, along with a corresponding energy distribution for the overlapping laser spots.

Overlapping laser spots 104, 104' may be used to tailor or manipulate the energy distribution of the lasers at the ablation site, as shown in FIGS. 11 and 12. For example, the round laser spots 104, 104' shown at the top of FIG. 11 overlap to form the composite laser spot 104", and the corresponding energy distribution 200 of the composite laser spot is shown in the chart of FIG. 11. The energy distribution includes a peak or maxima 202 in the region of the composite laser spot 104" where both laser beams are present. The actual shape of the energy distribution may vary from that shown here depending on several factors, including the individual energy distributions of each laser spot, the distance of the focal plane from each laser spot, and other factors. In this example, the composite laser spot 104" is directed along the intended trim line 140 of the sheet metal piece 12. FIG. 12 depicts a composite laser spot 104" where the individual laser spots 104, 104' are rectangular in shape, as opposed to the previous example where they are circular. Laser spots or footprints having different sizes, shapes, configurations, etc. may be used in lieu of or in addition to those described herein.

Figure 13:
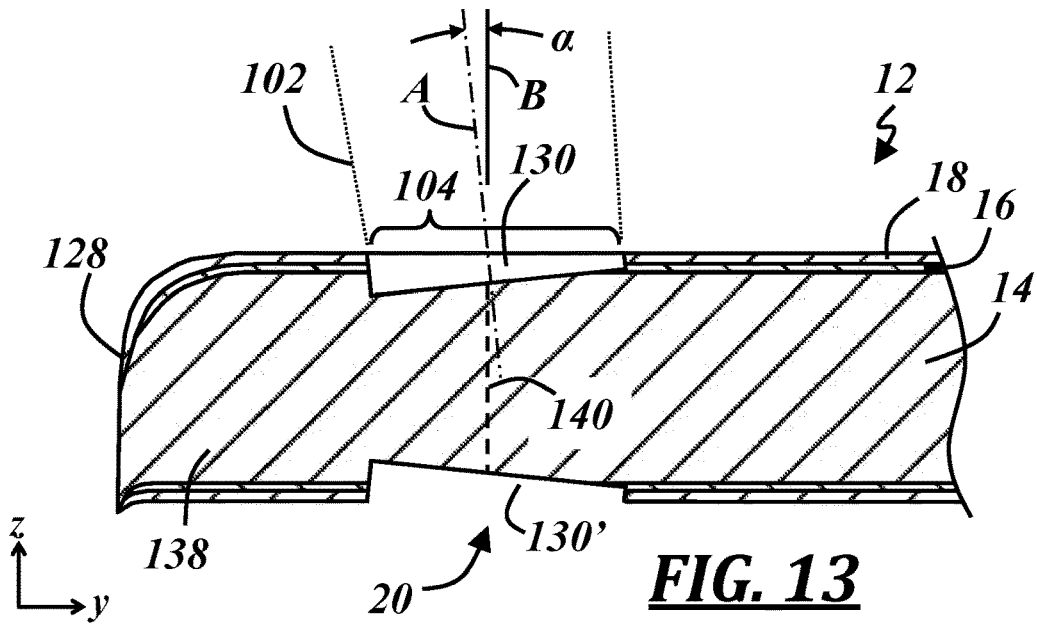
FIG. 13 is a cross-sectional view of an offset ablation process forming an ablation trench with a non-zero angle of incidence in a sheet metal piece.
Figure 14:
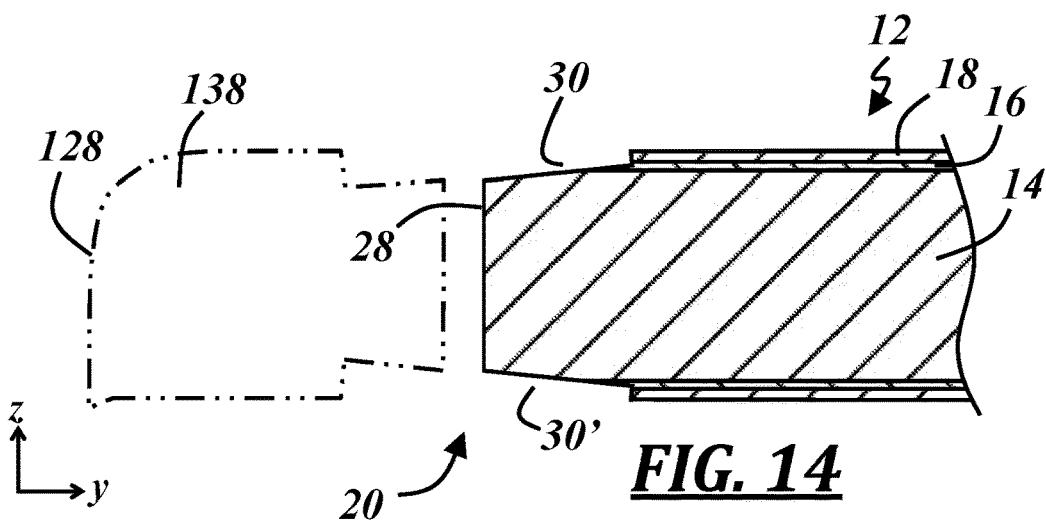
FIG. 14 is a cross-sectional view of the sheet metal piece of FIG. 13, where a portion of the edge region has been removed to form a weld notch.

Turning now to FIG. 13, there is shown another exemplary ablation process where the laser beam 102 is directed at the edge region 20 according to a non-zero or offset angle of incidence α. The angle of incidence α, as used herein, generally refers to the angle that is formed between a central axis A of the laser beam and a line B that is normal to the side surface of the sheet metal piece, and the angle can be positive or negative. In the previously illustrated embodiments, the angle of incidence α is zero; in the exemplary embodiment shown in FIG. 13, the angle of incidence α is between approximately 1° and 45° (e.g., about) 10°, but other angles are certainly possible depending on the particular application. A non-zero angle of incidence α can be used to form an ablation trench 130 and a resulting weld notch 30 that is offset with respect to the different material layers of the sheet metal piece 12. For instance, the resulting weld notch 30 shown in FIG. 14 is crooked or tilted. This can have a similar effect on the resulting weld notch as the dual-beam example of FIGS. 9-12, where it is possible that the base material layer 14 is exposed at the portion of the weld notch 30 nearest the finished edge 28, and is not exposed along the remainder of the weld notch. Put differently, the non-zero angle of incidence can form an offset ablation trench 130 that has a non-uniform depth D across its width W, where the depth of the offset weld notch can be managed in order to better control the material composition of a future weld joint.

Figure 15:
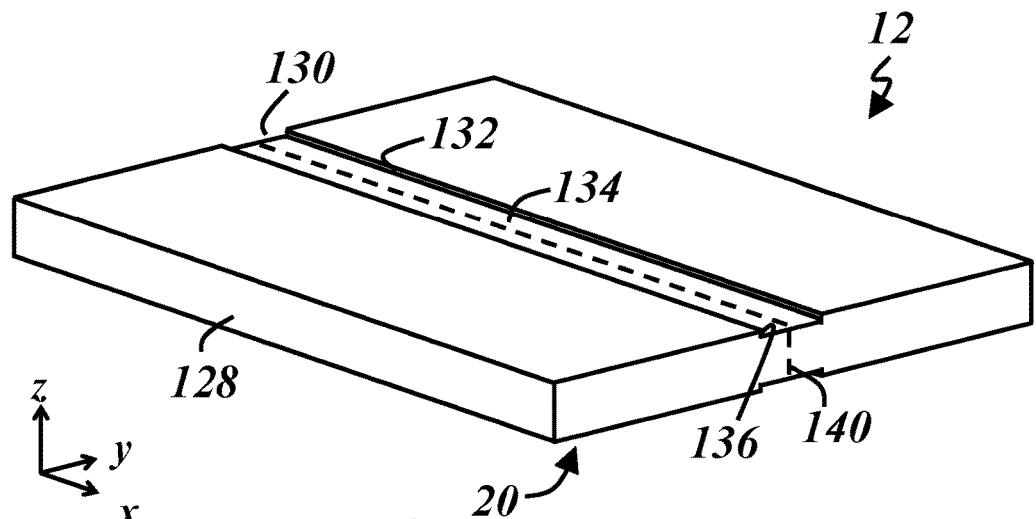
FIG. 15 is a perspective view of a sheet metal piece with an ablation trench formed away from the edge region.
Figure 16:
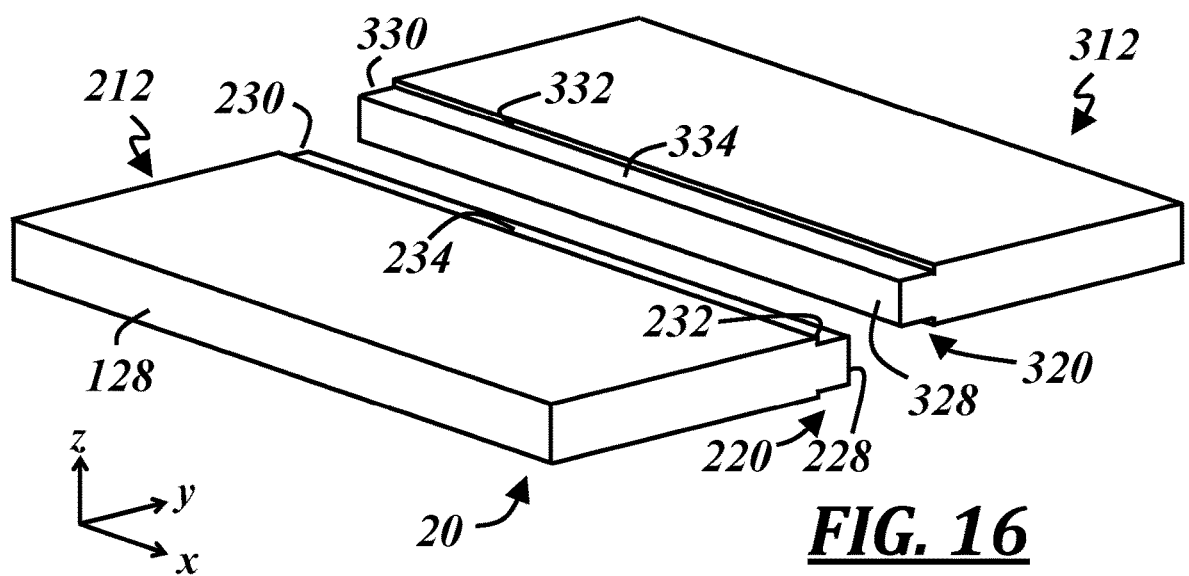
FIG. 16 is a perspective view of two sheet metal pieces formed by cutting the sheet metal piece of FIG. 15 along the ablation trench, where each of the two sheet metal pieces includes a weld notch along a newly formed edge region.

In another embodiment, the ablation trench 130 may be formed away from the edge region 20 where the starting edge 128 is arranged. In the example shown in FIGS. 15 and 16, the ablation trench 130 is formed away from the edge region 20 of the sheet metal piece 12, and the sheet metal piece is subsequently trimmed or cut along the trench at trim line 140 to form two sheet metal pieces 212 and 312. Each newly formed sheet metal piece 212, 312 includes a newly formed edge 228, 328 to be welded, and each edge is located along a newly formed edge region 220, 320 of each piece. In this case, each resulting weld notch 230, 330 may have a width that is about one half the width of the formed previously formed ablation trench 130. Or the sum of the widths of the resulting weld notches 230, 330 is the same as the width of the ablation trench 130. The first and third surfaces 132, 136 of the ablation trench 130 of FIG. 15 become the first weld notch surfaces 332, 232 of the resulting weld notches 330, 230. And the second surface of the ablation trench 130 is divided to become the second weld notch surfaces 334, 234 of the resulting weld notches 330, 230. In at least some of the previously described embodiments, where the trim line 140 is located within the edge region 120, the removed portion 138 of the sheet metal piece is not practically usable to be subsequently welded to another sheet metal piece to form a welded blank assembly—i.e., the distance L is too small and the removed portion 138 is discarded. The technique illustrated in FIGS. 15 and 16 results in first and second sheet metal pieces 212, 312, each with weld notches 230, 330 located along newly formed weldable edges 228, 328. Because the weldable edge 228, 328 are formed after one or more layers of material have been removed at the trim line 140 where the new edges are formed, the edges can be free from unwanted contaminants such as material from the coating material layer 18 and/or the intermediate material layer 16.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of forming a weld notch in a sheet metal piece, comprising the steps of:
   (a) providing a sheet metal piece having a plurality of material layers, wherein the plurality of material layers includes a base material layer having a thickness between 0.5 mm and 2 mm, inclusive, a coating material layer having a thickness between 5 µm and 100 µm, inclusive, and an intermediate material layer being located between the base material layer and the coating material layer and including an intermetallic compound having at least one constituent from each of the base material layer and the coating material layer, the intermediate material layer having a thickness between 1 µm and 15 µm, inclusive;
   (b) forming an ablation trench along the sheet metal piece by removing at least a portion of the coating material layer and a portion of the intermediate material layer along an ablation path so that the ablation trench is spaced away from an edge of the sheet metal piece and a portion of the base material layer is exposed at the ablation trench; and
   (c) cutting the sheet metal piece along the ablation trench at a trim line to form the weld notch, wherein the trim line is located at the portion of the base material layer that is exposed and at the trim line, material from both the coating material layer and the intermediate material layer is completely removed but a substantial portion of the base material layer remains.

2. The method of claim 1, wherein step (b) further comprises forming the ablation trench within an edge region of the sheet metal piece, and step (c) further comprises removing a portion of the edge region.

3. The method of claim 1, wherein step (b) further comprises forming the ablation trench away from an edge region of the sheet metal piece, and step (c) further comprises cutting the sheet metal piece into two separate sheet metal pieces.

4. The method of claim 1, wherein step (b) further comprises directing first and second laser beams toward the sheet metal piece so that the beams overlap at a composite laser spot and form the ablation trench with a non-uniform depth.

5. The method of claim 4, wherein the trim line is located at the portion of the ablation trench formed by the composite laser spot.

6. The method of claim 1, wherein step (b) further comprises directing a laser beam toward the sheet metal piece at a non-zero or offset angle of incidence (α) in order to form a weld notch that is offset with respect to the plurality of material layers.

7. A method of forming a weld notch in a sheet metal piece, comprising the steps of:
   (a) providing a sheet metal piece having a plurality of material layers, wherein the plurality of material layers includes a base material layer, a coating material layer, and an intermediate material layer being located between the base material layer and the coating material layer and including an intermetallic compound having at least one constituent from each of the base material layer and the coating material layer;
   (b) forming an ablation trench along the sheet metal piece by directing first and second laser beams toward the sheet metal piece so that the beams overlap at a composite laser spot and remove at least a portion of both the coating material layer and the intermediate material layer along an ablation path, wherein the ablation trench is defined in part by surfaces that oppose each other across the width of the ablation trench and a third surface extending between the opposing surfaces, the third surface is formed so that the ablation trench has a non-uniform depth across its corresponding width (W') with a portion of the ablation trench corresponding to the composite laser spot extending deeper into a thickness of the sheet metal piece than a remainder of the ablation trench; and
   (c) using the portion of the ablation path corresponding to the composite laser spot as a visual indicator and a trim line to cut a portion of the sheet metal piece that includes one of the opposing surfaces formed in step (b) to form the weld notch, wherein the weld notch is partly defined by the other of the opposing surfaces.

8. The method of claim 7, wherein the ablation trench is further defined in part by a third surface extending between the opposing surfaces, and step (c) further comprises cutting the sheet metal piece along a central region of the ablation trench so that the weld notch is further defined by a portion of the third surface and another portion of the third surface is removed in step (c).

9. The method of claim 7, wherein the ablation trench is further defined in part by a third surface extending between the opposing surfaces, and step (c) comprises cutting the sheet metal piece along one of the opposing surfaces so that the weld notch is further defined by substantially the entire third surface.

10. A method of forming a weld notch in a steel sheet metal piece, comprising the steps of:
   (a) providing a steel sheet metal piece having opposite first and second sides and a sheared edge extending therebetween, wherein material from a coating material layer along the first side extends at least partially along the sheared edge toward the second side in a shearing direction, wherein the coating material layer has a different composition than the steel sheet metal piece;
   (b) removing some of the coating material layer from the steel sheet metal piece along a pre-determined trim line location by directing a laser beam toward the sheet metal piece at a non-zero or offset angle of incidence (α) in order to form a weld notch that is offset with respect to the coating material layer, wherein the non-zero or offset angle of incidence (α) creates the weld notch that is more offset toward the sheared edge to account for the coating material layer toward the sheared edge; and
   (c) separating the steel sheet metal piece into first and second pieces along the trim line location, wherein the first piece includes a newly formed weldable edge having a portion of steel exposed on the first side of the steel sheet metal piece, and wherein the second piece includes the sheared edge.

11. The method of claim 10, wherein step (b) comprises forming an ablation trench along the trim line location, the ablation trench having a plurality of trench surfaces, at least a portion of some of the trench surfaces remain with the first steel sheet metal piece of step (c) as weld notch surfaces.

12. The method of claim 10, wherein the pre-determined trim line location is located within an edge region of the steel sheet metal piece so that the second piece is not usable to form a welded blank assembly.

13. The method of claim 10, wherein the pre-determined trim line is located away from edge regions of the steel sheet metal piece so that each of the first and second pieces includes a weld notch along a newly formed weldable edge having a portion of steel exposed on the first side of each of the first and second pieces, wherein each of the first and second pieces is usable to form a welded blank assembly.

* * * * *